United States Patent

Krude

[11] Patent Number: 4,472,159
[45] Date of Patent: Sep. 18, 1984

[54] ANGULARLY MOVABLE UNIVERSAL JOINT

[75] Inventor: Werner Krude, Siegburg-Kaldauen, Fed. Rep. of Germany

[73] Assignee: Uni-Cardan Aktiengesellschaft, Siegburg, Fed. Rep. of Germany

[21] Appl. No.: 329,329

[22] Filed: Dec. 10, 1981

[30] Foreign Application Priority Data

Dec. 20, 1980 [DE] Fed. Rep. of Germany ....... 3048341

[51] Int. Cl.³ .............................................. F16D 3/24
[52] U.S. Cl. ..................................... 464/141; 464/906
[58] Field of Search .......................... 464/139, 141, 906

[56] References Cited

U.S. PATENT DOCUMENTS

| 1,376,437 | 5/1921 | Hood | 464/141 |
| 2,879,651 | 3/1959 | Leto et al. | 464/139 |
| 3,564,868 | 2/1971 | Wildhaber | 464/141 |
| 3,802,221 | 4/1974 | Kimata | 464/141 |
| 4,156,354 | 5/1979 | Krude | 464/141 |
| 4,183,229 | 1/1980 | Johansson | 464/139 X |

FOREIGN PATENT DOCUMENTS

| 1185868 | 1/1965 | Fed. Rep. of Germany | 464/141 |
| 1218118 | 5/1960 | France | 464/141 |
| 379207 | 8/1964 | Switzerland | 464/141 |

Primary Examiner—John Petrakes
Assistant Examiner—Daniel P. Stodola
Attorney, Agent, or Firm—Toren, McGeady and Stanger

[57] ABSTRACT

In an angularly movable universal joint, a ring of balls extends around the axis of rotation of the joint with the balls being radially movably supported in bores in the inner joint member and guided within grooves in the outer joint member. Adjacent balls are in contact with one another through intercommunicating openings between adjacent bores. The area of the material of the inner joint member in a plane extending perpendicularly of the axis of rotation and including the centers of the balls is greater than zero but less than the maximum area of the cross section remaining when the rectangular area of the bores plus areas defined between the inner ends of the rectangular areas of the bores and a circular arc having a radius of the bores is removed.

1 Claim, 4 Drawing Figures

ANGULARLY MOVABLE UNIVERSAL JOINT

SUMMARY OF THE INVENTION

The present invention is directed to an angularly movable universal joint utilizing a uniformly circumferentially spaced arrangement of rolling members radially movably supported in openings in the inner joint member and guided in grooves in the outer joint member.

A universal joint of this type is disclosed in U.S. Pat. No. 4,156,354. In this known joint, the rolling members have at least partially spherically shaped surfaces with the spherically shaped surfaces of adjacent rolling members disposed in contact so that they support one another.

The rolling members are in the form of truncated or flattened balls and are not mass-produced standard items. For this reason, the universal joint is more expensive than is desired. If regular ball-shaped members are used, there would be very little material remaining in the inner joint member in the regions between adjacent balls and the joint would be unacceptably weak.

Therefore, it is the primary object of the present invention to form the inner joint member so that a high torque transmitting capacity can be achieved while using standard parts as the rolling members.

In accordance with the present invention, a universal joint is provided using balls as the rolling members with the balls fitted into radially extending bores in the inner joint member with the center lines of the bores intersecting the axis of rotation of the inner joint member. The cross-sectional area of the material of the inner joint member remaining in a plane perpendicular to the axis of rotation and containing the centers of the balls is greater than zero but is smaller than the maximum possible theoretical cross-sectional area of the material determined by the total cross-sectional area of the inner joint member less the areas of the bores in the plane where such areas each comprise a rectangular area and a radially inner area determined by one end of the rectangular area and a circular arc having a radius equal to the radius of the balls.

The advantage of the arrangement embodying the present invention is that the openings for the balls in the inner joint member are in the form of bores arranged so that the adjacent bores intersect one another affording communicating openings through which the balls in the bores can contact one another. Moreover, the cross-sectional area remaining in the inner joint member is sufficient for torque transmitting purposes. The following equation applies to the cross-sectional area of the inner joint member including the shaft core:

$$A_{th} > A > 0$$

with $$A_{th} = \frac{d_k^2}{n} n \left[ 2 \cotan\left(\frac{180}{n}\right) - \pi\left(\frac{n-2}{n}\right) \right]$$

where
- $A_{th}$ = maximum theoretical cross-sectional area of the material remaining.
- $n$ = number of balls.
- $d_k$ = diameter of balls.

The production of the joint embodying the present invention can be carried out relatively easily, since it is a straightforward manufacturing operation to drill or otherwise form the bores in the inner joint member into which the balls are fitted. A small diameter circle of the balls is achieved, so that the joint has a small overall size for a given torque transmitting capacity.

Joints according to the present invention are useful in a variety of fields, such as driving joints or steering joints in engineering applications, in shipbuilding and in motor vehicle construction.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
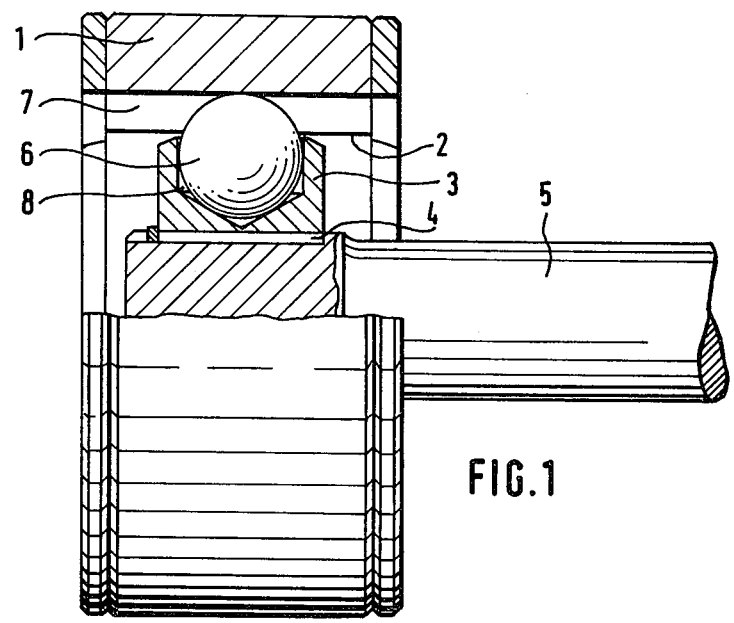
FIG. 1 is a side view, partly in section, of a universal joint embodying the present invention.
Figure 2:
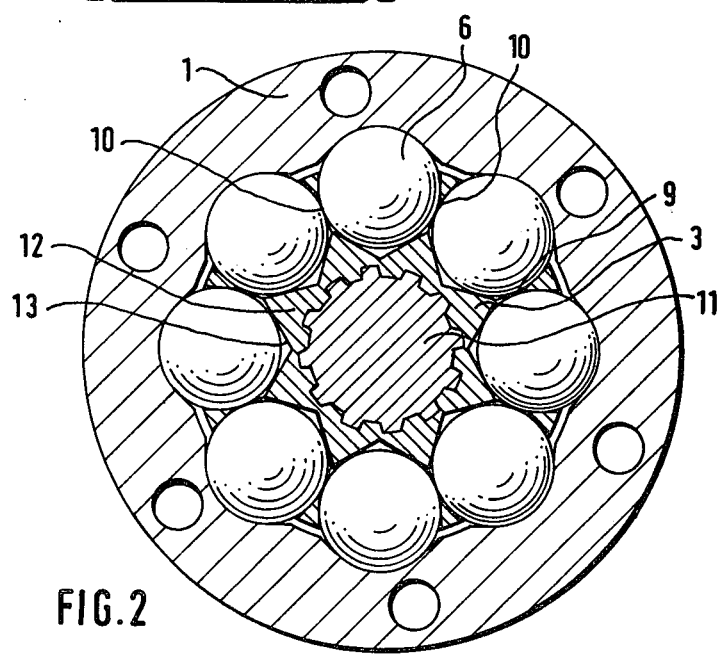
FIG. 2 is a transverse cross-sectional view of the universal joint illustrated in FIG. 1.

In FIGS. 1 and 2, the universal joint is made up of an outer joint member 1 having a hollow interior space into which an inner joint member 3 fits. The surface 2 of the outer joint member 1 defining the hollow interior space has a plurality of circumferentially spaced axially extending grooves 7 arranged parallel to one another. Inner joint member 3 has a splined bore 4 which receives the correspondingly splined end portion of a shaft 5. These parts are secured together by a circlip.

Torque is transmitted between the inner and outer joint members by a plurality of rolling members in the form of balls 6 arranged in a circle around the axis of rotation of the inner joint member. Each of the balls is guided within one of the grooves 7 in the outer joint member and in an oppositely aligned opening or bore 8 in the inner joint member. The openings or bores 8 extend radially outwardly from the axis of rotation 11 of the inner joint member. The bores 8 have a diameter corresponding to the diameter of the balls so that the balls can move radially relative to the axis of rotation 11 of the inner joint member. At the innermost end of each bore 8 there is a conical run-out portion formed in the production of the bores by drilling.

Because of the radial arrangement of the bores 8 and the depth to which they are drilled into the inner joint member, openings 9 are provided between adjacent bores. Thus, each pair of adjacent balls contact one another at the points 10 by extending through the opening 9. The cross-sectional area of material 12 remaining in the inner joint member, in the plane extending perpendicularly to the axis of rotation 11 of the inner joint member and containing the centers of the balls 6 reinforces the inner joint member. Such cross-sectional area is greater than zero but less than the maximum possible theoretical cross-sectional area of the material which would include the spaces 13 located at the radially inner ends of the bores which, in FIG. 2, are shown as conically shaped run-outs. If the ends of the bores were spherically shaped, with a radius the same as that of the balls 6, the space 13 would not exist and the cross-sectional area 12 of the inner joint member would be greater.

Figure 3:
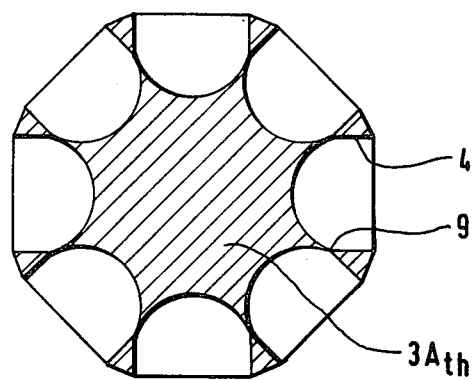
FIGS. 3 and 4 are cross-sectional views of different embodiments of an inner joint member for the universal joint embodying the present invention, with each embodiment using a different number of balls.
Figure 4:
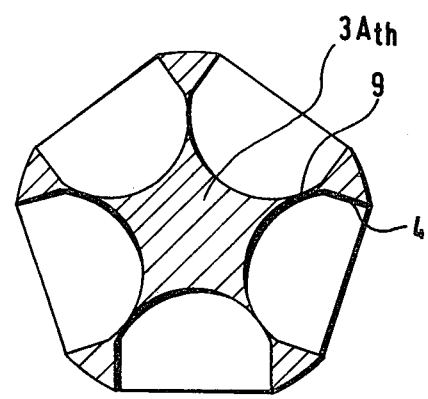

FIGS. 3 and 4 illustrate different embodiments of the present invention displaying the cross-section of inner joint members each formed to receive a different number of balls. These sections illustrate the maximum theoretical area $A_{th}$ of material remaining in the plane containing the centers of the balls and extending perpendicularly of the axis of rotation of the inner joint member. These sections also show the passages 9 formed between the bores located in the circular end sections of the bores rather than in the cylindrically shaped portion 14, that is, the portions which appear as rectangularly shaped in FIGS. 3 and 4. In other words each bore, as viewed in section, is formed of a rectangular area and another area defined by the end of a rectangular area and the circular arc defining the base of the bores.

The area $A_{th}$ can be calculated by the following formula:

$$A_{th} = \frac{d_k^2}{n}\left[2\cotan\left(\frac{180}{n}\right) - \pi\left(\frac{n-2}{n}\right)\right]$$

with n = number of rolling members and
$d_k$ = diameter of rolling members or balls.

I claim:

1. An angularly movable universal joint having an axis of rotation includes an axially extending shaft, an outer joint member having an interior surface forming an interior hollow space, an annular inner joint member positioned within the hollow space and mounted on said shaft for rotation therewith, said annular inner joint member having a radially inner surface and a radially outer surface, said interior surface of said outer joint member has uniformly circumferentially spaced axially extending grooves formed therein, said inner joint member has radially extending openings opposite said grooves with said openings extending inwardly from the outer surface of said inner joint member to a location spaced outwardly from the inner surface of said inner joint member, the adjacent openings in said inner joint member having open portions therebetween intermediate the radially inner and outer ends of said openings, rolling members are radially movably supported in said openings and extend outwardly therefrom into and guided within said grooves, said rolling members each having at least a partly spherical surface and said rolling members arranged so that said at least partly spherically surfaces on adjacent said rolling members are in supporting contact through the open portions in adjacent said openings and forming a ring of said rolling members around the axis of said shaft intermediate the radially inner surface and the radially outer surface of said inner joint member, said rolling members are balls, said openings in said inner joint member are bores each having a center line extending radially outwardly from and intersecting the axis of said shaft mounting said inner joint member at a common point, and said inner joint member has an annular shaped section closed continuously in the circumferential direction between the radially inner surface thereof and the radially inner ends of said openings therein.

* * * * *